United States Patent
Münz et al.

(10) Patent No.: US 10,811,931 B2
(45) Date of Patent: Oct. 20, 2020

(54) ELECTRICAL CONNECTION ARRANGEMENT AND METHOD FOR PRODUCTION THEREOF

(71) Applicant: ebm-papst Mulfingen GmbH & Co. KG, Mulfingen (DE)

(72) Inventors: Martin Münz, Mulfingen-Hollenbach (DE); Florian Friedlein, Ravenstein-Hüngheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 141 days.

(21) Appl. No.: 15/516,746

(22) PCT Filed: Nov. 11, 2015

(86) PCT No.: PCT/EP2015/076361
§ 371 (c)(1),
(2) Date: Apr. 4, 2017

(87) PCT Pub. No.: WO2016/078990
PCT Pub. Date: May 26, 2016

(65) Prior Publication Data
US 2017/0302132 A1    Oct. 19, 2017

(30) Foreign Application Priority Data

Nov. 18, 2014  (DE) .................. 10 2014 116 838

(51) Int. Cl.
*H02K 5/22*         (2006.01)
*H01R 13/50*    (2006.01)
(Continued)

(52) U.S. Cl.
CPC ............ *H02K 5/225* (2013.01); *H01R 9/226* (2013.01); *H01R 13/50* (2013.01); *H01R 13/6315* (2013.01); *H01R 43/24* (2013.01)

(58) Field of Classification Search
CPC ........ H01R 9/226; H01R 13/50; H01R 13/04; H01R 12/91; H01R 13/6315; H01R 43/24; H02K 5/225
(Continued)

(56) References Cited

U.S. PATENT DOCUMENTS 3,899,305 A * 8/1975 Hilgers ............. B29C 45/14655
                                                    257/668
5,122,066 A * 6/1992 Plossmer ............... H01R 13/111
                                                    439/246

(Continued)

FOREIGN PATENT DOCUMENTS

DE   102008050004 A1   4/2010
DE      4312423 B4      8/2012
(Continued)

OTHER PUBLICATIONS

Machine Translation for JP2007258105A.*
International Search Report (in German with English Translation) for PCT/EP2015/076361, dated Feb. 9, 2016; ISA/EP.

*Primary Examiner* — Oscar C Jimenez
*Assistant Examiner* — Paul D Baillargeon
(74) *Attorney, Agent, or Firm* — Harness, Dickey & Pierce, P.L.C.

(57) ABSTRACT

The present disclosure relates to an electrical connector assembly for a motor and a method for producing the electrical assembly. The electrical connector assembly includes a first electrical terminal device, disposed at one end and having electrical terminals, and a second electrical terminal device, disposed at the other end having electrical terminals. A wire rail with the terminals connects the two terminal devices. The wire rail and at least parts of the terminal devices are jointly encompassed and insulated relative to one another by an insulating material.

15 Claims, 2 Drawing Sheets

(51) Int. Cl.
*H01R 43/24* (2006.01)
*H01R 13/631* (2006.01)
*H01R 9/22* (2006.01)

(58) Field of Classification Search
USPC .................................. 439/577, 604, 722, 736
See application file for complete search history.

(56) References Cited

U.S. PATENT DOCUMENTS

| | | | |
|---|---|---|---|
| 5,201,663 A * | 4/1993 | Kikuchi | H01R 13/6315 439/248 |
| 5,685,069 A | 11/1997 | Peter et al. | |
| 6,371,817 B1 | 4/2002 | Shi et al. | |
| 8,357,015 B2 * | 1/2013 | Kohmura | B29C 45/14639 439/736 |
| 8,534,641 B2 * | 9/2013 | Schalowski | H01R 12/58 251/129.15 |
| 2001/0022050 A1 * | 9/2001 | Bentz | H02K 5/225 49/502 |
| 2008/0284273 A1 * | 11/2008 | Purvines | H01R 13/6608 310/418 |
| 2010/0042048 A1 | 2/2010 | Christensen | |
| 2010/0252764 A1 * | 10/2010 | Schalowski | B60T 8/3675 251/129.15 |
| 2013/0130534 A1 * | 5/2013 | Ohkuma | H01R 12/7052 439/345 |
| 2013/0153291 A1 * | 6/2013 | Adachi | H01R 13/504 174/70 R |
| 2014/0187098 A1 * | 7/2014 | Kobayashi | H01R 12/91 439/660 |
| 2014/0342614 A1 * | 11/2014 | Yukutake | H01R 13/46 439/626 |

FOREIGN PATENT DOCUMENTS

| | | |
|---|---|---|
| EP | 1777789 B1 | 1/2013 |
| FR | 2741751 A1 | 5/1997 |
| JP | 2007258105 A * | 10/2007 |
| JP | 2010099457 A | 5/2010 |
| WO | WO-2012033217 A1 | 3/2012 |

* cited by examiner

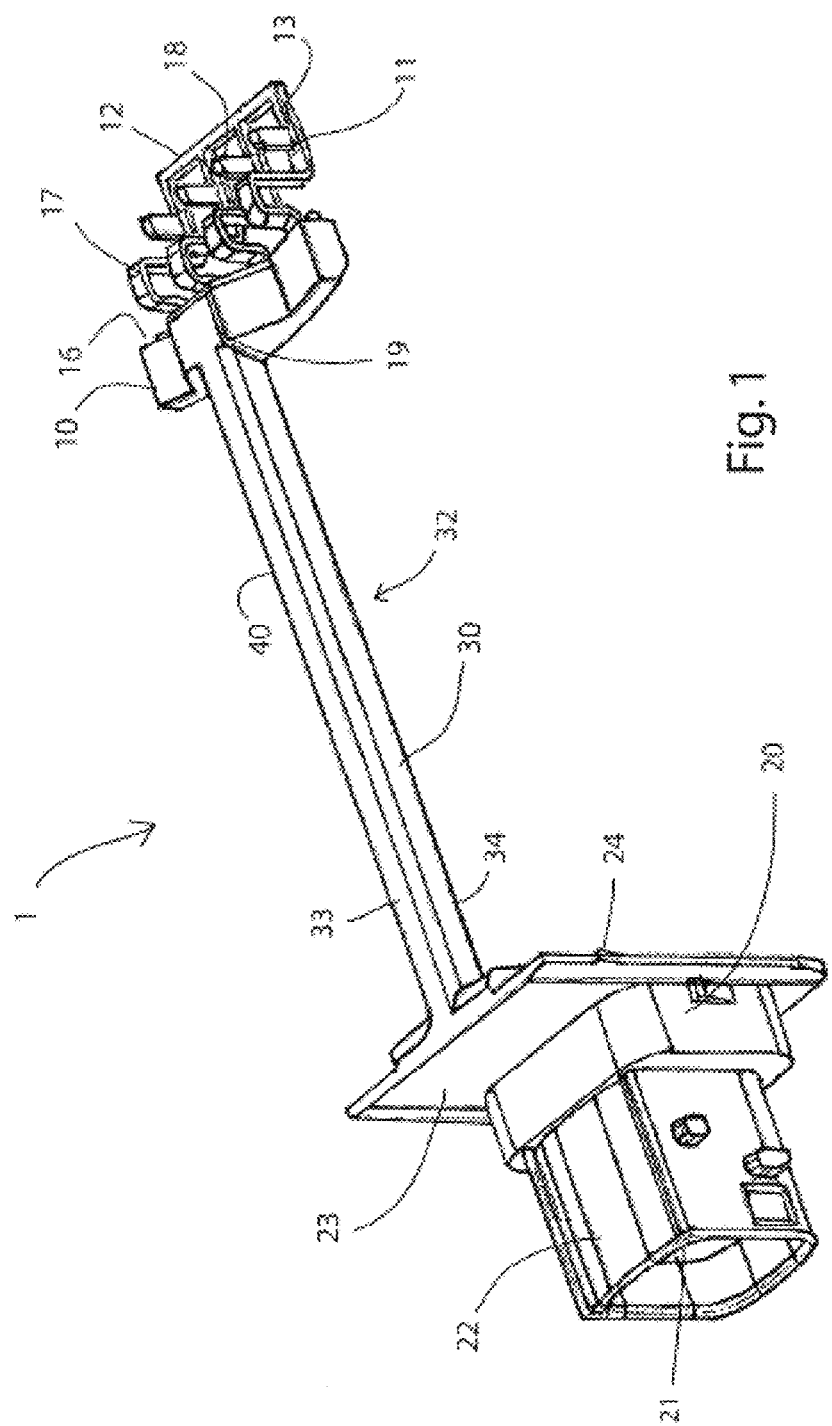

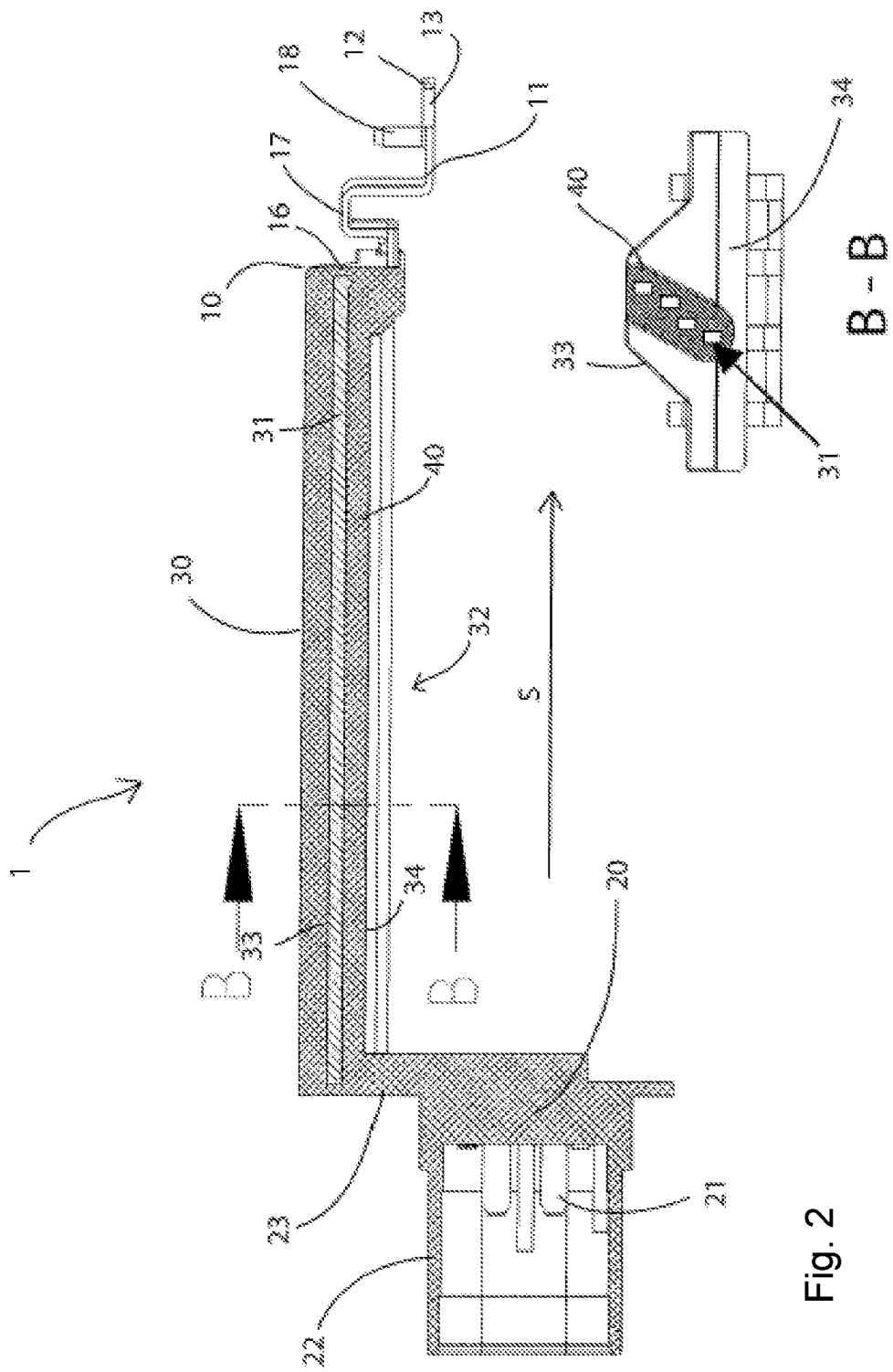

ELECTRICAL CONNECTION ARRANGEMENT AND METHOD FOR PRODUCTION THEREOF

CROSS REFERENCE TO RELATED APPLICATIONS

This application is a U.S. National Phase Application under 35 U.S.C. 371 of International Application No. PCT/EP2015/076361 filed on Nov. 11, 2015 and published in German as WO 2016/078990 A1 on May 26, 2015. This application claims priority to German Application No. 10 2014 116 838.0 filed on Nov. 18, 2014. The entire disclosures of all of the above applications are incorporated herein by reference.

FIELD

The disclosure relates to an electrical connector assembly for a motor and to a method for producing such a connector assembly. In particular, the disclosure relates to an electrical motor connector that has a compact design for connection to a motor, and a small number of individual parts.

BACKGROUND

Wiring assemblies for connection to motors, or more generally motor connection cables, are known in the prior art. In general, such assemblies consist of two connectors, with a cable disposed between the two connectors. The number of poles and thus the number of terminals or contacts in the connectors is based on the requirements of the specific motor application. Power lines for the transmission of electrical current and optionally control lines or signal lines for transmitting signals are customarily combined in a cable assembly. The contacts of the connectors are commercially available contacts, which are formed as either screwed contacts or crimped contacts, or are provided with some other suitable terminal geometry or connection. For instance, one side of the cable assembly may also be equipped, for example, with a (free) cable end that can be connected to a motor terminal device, which requires an additional assembly step.

It is a further disadvantage that the quality of crimp connections to crimp contacts, for example, is dependent on their proper assembly and necessitates additional testing measures. Furthermore, commercially available connectors are frequently complex and composed of many individual parts that must be assembled correctly.

In general, therefore, the disadvantages of such structures include the large number of parts, the amount of effort required for their assembly, and the necessary expenditure on testing and inspection.

JP 2010099457 discloses a vehicle cable assembly that is additionally equipped in a simple manner with a solid element to protect the assembly against bending and buckling, but that requires a large total number of individual parts for assembly.

An alternative option for supplying a motor or an electric power unit with power (i.e., high currents) involves the use of busbars.

DE 4312423 B4 discloses a busbar for receptacle boxes, which is made of a flat metal material. However, the busbar is embodied merely as a single-pole bar, and has no devices to prevent direct contact, insulating parts, or seals to prevent the penetration of moisture and other environmental factors.

DE 10 2008 050 004 A1 discloses a further embodiment of a busbar which likewise has the aforementioned disadvantages.

There is a growing demand for ready-made assembly modules that are designed to establish connections cost-effectively and easily. For instance, EP 1777789 B1 discloses a preassembled electrical installation unit, however said unit is complex in structure and cannot be readily transferred to motor applications.

SUMMARY

The present disclosure should also factor in additional constraints that are inherent in motor applications such as installation space, housing, tolerances, etc. Consequently, the solutions existing on the market cannot be transferred, or at least cannot be readily transferred, to motor applications.

In light of the above circumstances, it is the object of the present disclosure to overcome the aforementioned disadvantages and to provide an electrical connector assembly for a motor and a method for producing such a connector assembly, which can be used as a preassembled installation unit, requires a minimum number of components, and can be produced and used with low expenditure on assembly and testing.

The basic concept of the present disclosure is to provide a preassembled module in which the two terminal sides with their terminals (contacts) and the connection therebetween are embodied as an integral, preferably rigid connector assembly comprising a number of rigid interconnected wiring elements, preferably overmolded by a common electrical insulating material. This eliminates the need to provide a connecting cable with its terminal ends between or at the two terminal ends. As a result, crimp contacts, for example, or any other connections that may be produced can also be dispensed with for connecting a motor. In addition, the effort required for assembly is substantially reduced and simplified. Furthermore, susceptibility to malfunction due to a potentially faulty assembly can be reduced, since it is necessary only to install the finished module.

Thus according to the disclosure, an electrical connector assembly for a motor is provided, comprising a first electrical terminal device disposed at the end and having electrical terminals (contacts), preferably embodied with contacts for insertion of a connector, and a second electrical terminal device disposed at the end and having electrical terminals (contacts), preferably embodied as contacts for insertion or direct connection to a connector, and a wire rail embodied as integral with the terminals and connecting the two terminal devices, wherein the wire rail and at least parts of the terminal devices are encompassed together and insulated relative to one another by an insulating material.

As will be discussed in detail later in the description of the figures, the terminal devices are thus advantageously terminal devices into which a detachable connector can be inserted or to which such a connector can be connected, as appropriate.

It is further advantageously provided that the wire rail has a plurality of wire tracks, the wire tracks each being formed at one end as integral with one of the terminals and at the other end as integral with one of the other terminals. In other words, a terminal with contacts is provided at each end of each of the wire tracks. The terminal at one end is used for connection to a motor (preferably via one motor connector) and the other terminal at the other end is used for connection to a customer-side element, e.g. a receptacle in a motor control unit that is to be connected.

In a preferred embodiment of the disclosure, it is further provided that the insulating material is also provided between the wire tracks, specifically encapsulating the wire tracks. This serves to ensure protection against external contact, while at the same time ensuring electrical insulation between the wire tracks. The selected insulating material, and in particular the selected thickness or strength of the insulation, must be adapted to the respective insulation requirements, for example, and to the specific requirements in terms of a single, double or reinforced insulation, for example. The selection of the plastic material is further based on the insulation material group and on other parameters.

In a particularly preferred embodiment of the disclosure, an injectable plastic is used as the insulating material, and the wire track is overmolded with the insulating material using a plastic injection molding process. Using a tool designed specifically for this purpose enables reproducible quality to be ensured for large production quantities.

In a further refinement of the disclosure, it is provided according to the disclosure that the terminals of the terminal device are integrally interconnected by means of a connecting bridge. This ensures the fixing of positions during production of the electrical connector assembly. It is further preferred for a predefined breaking point to be provided, as appropriate, between the connecting bridge and each of the terminals. In this manner, once the entire assembly module, i.e. the electrical connector assembly, has been completed, the terminals, and accordingly the wire tracks, that up to that point have remained electrically and mechanically connected can be electrically disconnected by a severing of the respective connecting bridge at the predefined breaking point.

In a particularly advantageous embodiment of the disclosure, the entire wire rail is embodied as a rigid wire rail, preferably as an integral, rigid wire rail, cast from aluminum die-cast material.

In a further preferred embodiment of the disclosure, the terminal device comprises a connector contour that encompasses the terminals and is made of an insulating material, more preferably is embodied as integral with the insulating material. For instance, it is conceivable for a terminal connector housing or a corresponding mating contour designed for the terminal to be integrally injected molded onto one or both terminal sides. A particularly compact assembly module with a small number of individual parts is thereby obtained.

It can further be provided according to the disclosure that the terminal device has a flat flange on which a connector contour integrally formed with the flange is attached, forming a receptacle for the terminals and protruding frontally beyond the terminals. Other integrally formed terminal connector housing forms that are adapted to the respective application may alternatively be provided. In a further alternative embodiment, the segment produced in this manner may also be overmolded two or more times with a plastic material that is necessary for each of the properties of the segment in question.

In a likewise advantageous embodiment of the disclosure, the wire rail is substantially rod-shaped, extending lengthwise in an extension direction S, and is encapsulated by the insulating material. A compact design can thereby be achieved. Alternatively, appropriate bends and/or curves may be provided along the wire rail to optimally adapt the shape of the finished assembly module to the application.

A further aspect of the present disclosure relates to the method for producing an electrical connector assembly as described above, comprising the following steps:

a. Producing an integral wire rail having a plurality of wire tracks and end-side terminals, the terminals being integrally interconnected at or near one end of the terminals by means of a connecting bridge;

b. Overmolding the wire rail so as to insulate the wire tracks relative to one another, and to form two end-side terminal devices that have accessible terminals.

In a preferred refinement of the method according to the disclosure, one of the terminal devices is formed with at least one connector contour that is open on one side, forming a receptacle for the terminals which protrudes frontally beyond the terminals.

It can thus be further provided that one of the terminal devices is produced with a terminal connector housing shape that is adapted to the respective application, e.g. during overmolding, one of the terminal devices may be formed with a terminal contour that has a flat side on its end face, for positioning against a mating contour on the motor terminal block, and from the end face of which the terminals protrude and can be contacted on the motor terminal side.

The method is advantageously designed such that during production step a), a predefined breaking point is implemented between the connecting bridge and the terminals.

Other advantageous refinements of the disclosure will be described in greater detail in the following, in conjunction with the description of the preferred embodiment of the disclosure, with reference to the figures.

DRAWINGS

FIG. 1 a perspective view of an embodiment of an electrical connector assembly according to the disclosure, and FIG. 2 is a longitudinal sectional view of the connector assembly of FIG. 1.

FIG. 3 is a cross-sectional view of the connector assembly of FIG. 2.

DESCRIPTION

In the following, an exemplary embodiment of an electrical connector assembly 1 according to the disclosure is described, with reference to FIGS. 1-3. FIG. 1 shows a perspective view of an electrical connector assembly 1 comprising a first electrical terminal device 10, disposed at one end and having electrical terminals 11 for connection to a motor (first connector 10), and a second electrical terminal device 20, disposed at one end and having electrical terminals 21 for connection to an external device (second connector 20). Further provided is a wire rail 30 that is embodied as integral with the terminals 11 and connects the two terminal devices 10, 20 to one another. As is clear from the sectional view of FIGS. 2 and 3, wire rail 30 and parts of terminal devices 10, 20 are jointly encompassed by an insulating material 40. The housing of terminal device 20, which encompasses terminals 21, is integrally formed from insulating material 40, which encompasses wire rail 30. In this embodiment, wire rail 30 is embodied as a rigid wire rail cast from aluminum die-cast material.

As is clear from the sectional view of FIG. 3, wire rail 30 has a plurality of wire tracks 31, each wire track 31 integrally forming one of terminals 11 at one end, and integrally forming one of terminals 21 at its other end. Wire tracks 31 are offset from one another heightwise at an oblique angle from vertical, and are arranged substantially parallel to one another, with the tracks being formed in the regions of the terminal device based on the terminal contour.

Wire tracks 31 are electrically insulated from one another by introducing an insulating material 40 made of injectable plastic as appropriate into the gaps between the wire tracks 31 during overmolding. Insulating material 40 is thus also provided between wire tracks 30, encompassing wire tracks 30, to achieve the necessary insulation strength. Wire rail 30 extends with a center section 32 lengthwise in an extension direction S, and in this center section 32 is substantially rod-shaped.

As is clear from FIG. 1, each of terminals 11 projects outward from end face 16 of terminal device 10 as a U-shaped terminal section 17, at the end of which a contact member 18 is attached, projecting upward. As is clear from FIGS. 1-3, the U-shaped terminal section provides tolerance compensation, allowing tolerances and also movements in and transversely to the direction of extension to be resisted. Attached thereto, transversely to terminals 11, is a connecting bridge 12, which integrally interconnects terminals 11 via a predefined breaking point 13.

As is further clear from FIGS. 1-3, the underside of each terminal 11 is designed as flat in the region of the upwardly projecting contact 18, to enable circuit board mounting as an option. A terminal connector can be connected to the four upwardly projecting contacts.

Terminal device 10 is formed from insulating material 40 as a terminal block having a trapezoidal center part 19.

Predefined breaking point 13 and each of the predefined breaking points 13 between terminals 11 and connecting bridge 12 may have any design that is suitable to enable easy separation, for example as a tapered section of material.

Terminal device 20 forms a connector contour 22 that encompasses terminals 21 and is made of insulating material 40. Terminal device 20 further forms a flat flange 23, from which connector contour 22, which is open on one side, extends. Flange 23 is integrally connected in an upper flange region to the substantially linearly extending center section 32. Center section 32 has a trapezoidal upper section 33 and a flat base section 34. Flange 23 may further be equipped at its lateral edge e.g. with retaining hooks 24 to facilitate securing to a housing wall.

Electrical connector assembly 1 is produced by the following steps:
a. Casting an integral wire rail 30 with a plurality of wire tracks 31 and end-side terminals 11, 21 made of die-cast aluminum, with terminals 11 being integrally interconnected at their ends by means of a connecting bridge 12;
b. Overmolding the wire rail 20 in an overmolding tool, in which the final shape to be produced is provided in the form of cavities, forming the two end-side terminal devices 10, 20.

The disclosure is not restricted in its design to the preferred embodiments described above. A number of variants are conceivable which make use of the described solution even in fundamentally different configurations.

What is claimed is:

1. An electrical connector assembly for a motor, the electrical connection assembly comprising
    a first electrical connector disposed at a first end and having first electrical contacts,
    a second electrical connector disposed at a second end and having second electrical contacts,
    a connector contour of said second connector encompassing the second electrical contacts, and
    a rigid wire rail integral with the first and second contacts, the wire rail encompassed and insulated by an insulating material, the wire rail with the insulating material includes a terminal end, a tolerance compensation member positioned at the terminal end of the wire rail and the insulated material between the wire rail and the first electrical contacts so that the tolerance compensation member projects from the insulation material, the tolerance compensation member having a U-shape and being formed from the wire rail such that the tolerance compensation member provides tolerances and movement in an axial direction of extension of the first electrical contacts and in a direction transverse to the direction of extension of the first electrical contacts, the rigid wire rail connecting the first and second electrical connectors, and the first electrical contacts projecting in a direction transverse to the axial direction of the extension.

2. The electrical connector assembly according to claim 1, wherein the wire rail has a plurality of wire tracks, and
    each of the wire tracks is integrally connected at one end to one of the first electrical contacts, and is integrally connected at its other end to one of the second electrical contacts.

3. The electrical connector assembly according to claim 2, wherein the insulating material is present between the wire tracks, encompassing the wire tracks.

4. The electrical connector assembly according to claim 1, wherein the wire rail is overmolded with the insulating material by means of an injection molding process.

5. The electrical connector assembly according to claim 1, wherein the first electrical contacts of the first electrical connector are integrally interconnected by means of a connecting bridge.

6. The electrical connector assembly according to claim 5, wherein a predefined breaking point is provided between the connecting bridge and each of the first electrical contacts.

7. The electrical connector assembly according to claim 1, wherein the wire rail is a rigid wire rail.

8. The electrical connector assembly according to claim 1, wherein the connector contour that encompasses the second electrical contacts is made of an insulating material.

9. The electrical connector assembly according to claim 1, wherein the second electrical connector has a flat flange, onto which the connector contour is integrally formed and attached, forming a receptacle for the second electrical contacts that protrudes frontally beyond the second electrical contacts.

10. The electrical connector assembly according to claim 1, wherein the wire rail has a substantially rod-shaped form, extending lengthwise in an extension direction, and is encompassed by the insulating material.

11. The electrical connector assembly according to claim 1, wherein the wire rail includes a rigid wire rail cast from an aluminum die-cast material.

12. A method for producing an electrical connector assembly comprising the following steps:
    producing an integral wire rail having a plurality of wire tracks, the wire rail encompassed and insulated by an insulating material, the wire rail with the insulating material includes a terminal end, a tolerance compensation member having a U-shape and being formed from the wire rail enabling axial and transverse movement of the tolerance compensation member, and first and second end-side contacts, the tolerance compensation member integrally formed at the terminal end of the wire rail and the insulated material between the wire tracks and the first or second end-side contacts so that the tolerance compensation member projects from the insulation member, wherein the first or second end-side contacts are integrally interconnected at or near one end of the first or second end-side contacts by means of a connecting bridge and the first or second end-side contacts projecting in a direction transverse to an axial direction of the wire rail; and overmolding the wire rail so as to insulate the wire tracks relative to one another, and to form first and second end-side connectors.

13. The method according to claim 12, wherein one of the first and second end-side connectors has a connector contour that forms a receptacle for the first or second end-side contacts and protrudes frontally beyond the terminals.

14. The method according to claim 12, wherein one of the first and second end-side connectors has a terminal contour with a flat side on its end face, from which the contacts protrude frontally.

15. The method according to claim 12, wherein in the producing step, a predefined breaking point is provided between the connecting bridge and the contacts.

\* \* \* \* \*